United States Patent [19]
Pasquini et al.

[11] Patent Number: 5,755,853
[45] Date of Patent: May 26, 1998

[54] PROCESS FOR THE TREATMENT OF SOLID RESIDUES CONTAINING METALS, IN PARTICULAR RESIDUES FROM THE CLEANING OF HOUSEHOLD GARBAGE INCINERATION SMOKE

[75] Inventors: Pierre Pasquini, Fontainebleau; Roger Meunier, Moncourt Froronville; Olivier Leclerc, Moret sur Loing; Fabrice Lebrun, Paris, all of France

[73] Assignee: Electricite de France - Service National, Paris, France

[21] Appl. No.: 764,015

[22] Filed: Dec. 11, 1996

[30] Foreign Application Priority Data

Dec. 13, 1995 [FR] France ................. 95 14 798

[51] Int. Cl.$^6$ ............................................. C22B 9/00
[52] U.S. Cl. ........................ 75/419; 75/419; 75/401; 75/392; 75/414; 75/416; 75/417; 75/418; 75/503; 75/506
[58] Field of Search ............... 75/419, 401, 392, 75/414, 416, 417, 418, 503, 506

[56] References Cited

U.S. PATENT DOCUMENTS

| | | |
|---|---|---|
| 3,653,875 | 4/1972 | Waters et al. ................. 75/21 |
| 5,259,863 | 11/1993 | Schneider et al. ............ 75/414 |
| 5,653,182 | 8/1997 | Sorvik ........................... 110/250 |

FOREIGN PATENT DOCUMENTS

| | | | |
|---|---|---|---|
| WO9322001 | 11/1993 | WIPO | A62D 3/00 |
| WO9423856 | 10/1994 | WIPO | B09B 3/00 |

*Primary Examiner*—David A. Simmons
*Assistant Examiner*—M. Alexandra Elve
*Attorney, Agent, or Firm*—Sughrue, Mion, Zinn, Macpeak & Seas, PLLC

[57] ABSTRACT

This process comprises; mixing (1) the solid residues with a solid reducing agent; treating (2) the mixture in a furnace at a temperature above 1000° C. to obtain (3) a vitrified product rendered poor in metals and an emission of gas enriched in metallic elements in a vapour phase; air quenching (4) the gases rich in metals; filtering (5) the products resulting from the air quenching to obtain secondary ashes rich in metallic salts; at the end of the filtering operation, washing the smoke (6) for discharging it to the atmosphere; and subjecting the secondary ashes rich in metallic salts to a treatment for producing a product rich in valuable metals (7 to 10).

15 Claims, 1 Drawing Sheet

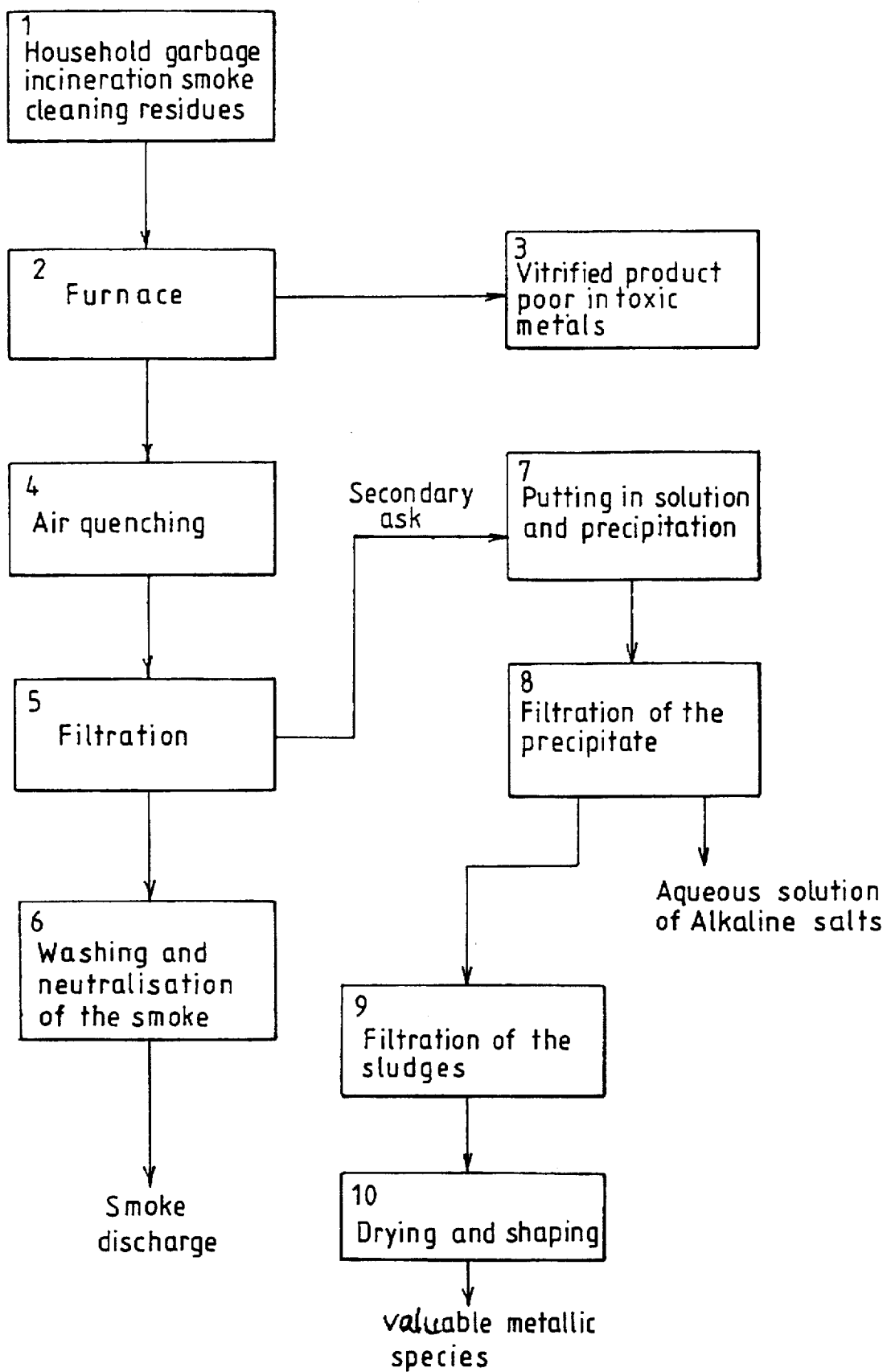

PROCESS FOR THE TREATMENT OF SOLID RESIDUES CONTAINING METALS, IN PARTICULAR RESIDUES FROM THE CLEANING OF HOUSEHOLD GARBAGE INCINERATION SMOKE

BACKGROUND OF THE INVENTION

The present invention relates to the treatment of wastes rich in metallic elements and more particularly concerns a technique for the treatment of residues resulting from the incineration of household garbage or sludges containing metallic or like elements.

As is known, urban centres are productive of a great amount of wastes including household garbage, which present serious problems to both municipalities and authorities as concerns both their collection and their treatment for decreasing their volume and mass, and also for reducing their harmfulness.

A conventional process employed for the treatment of household garbage consists in incinerating it.

This permits obtaining a considerable reduction in volume and weight with a possible recovery of heat energy.

The incineration, which is usually carried out at a temperature of the order of 1000° C. in the presence of excess air, produces in addition to the gases residues of solid particles.

It is accepted that a ton of treated household garbage produces on the order of 200 to 250 kg of clinker, about 30 kg of fly ashes, hereinafter termed HGISCR (household garbage incineration smoke cleaning residues) collected at the boiler by filtration and/or dust extraction of the gases. These ashes are rich in salts and toxic metallic elements such as Hg, Zn, Pb, Cd.

Now, all these residues, in particular the residues from the cleaning of incineration smoke, are most often dangerous owing to the fact that they may release harmful substances by leaching and consequently these residues are hazardous for the ground and the groundwater or phreatic water.

Owing to their toxicity, these residues must, since Mar. 31, 1995, be stabilized and placed in Technical Burial Centres (TBC) commonly termed class 1 dumping sites.

The pouring of trash into the dumping sites is subjected to national, and even European, regulations which are ever-changing and are becoming more and more severe for the protection of the environment and the preservation of the groundwater in particular.

This is in particular the case of fly ashes which according to present French specifications can only be stored after stabilization in class 1 dumping sites, the subsoil of which comprises a watertight clay layer at least 6 m. thick.

At the present time there are only eleven class 1 dumping sites in France satisfying the aformentioned conditions, only one of these dumping sites being located south of the Loire.

Vitrification is one of the stabilization methods whereby it is possible to obtain a stabilized product which is but little sensitive to leaching.

French patent application No. 94 13 477 filed on Nov. 9, 1994 by the Applicant relates to a process for the treatment of wastes rich in metallic elements, in particular residues of the cleaning of household garbage incineration smoke, comprising:

a) melting the wastes in a furnace to vitrify them;

b) oxidizing the smoke from the furnace with air at ambient temperature;

c) effecting a dry quenching by adding air of the oxidized smoke;

d) filtering the quenched oxidized smoke to obtain secondary ashes rich in metallic elements;

e) washing the quenched and filtered oxidized smoke so as to neutralize it and discharging this smoke;

f) recovering the secondary ashes containing metallic salts produced during the quenching step and during the filtering step;

g) forming an aqueous solution from the secondary ashes containing the metallic salts and precipitating the metals in the form of hydroxides or sulphides or insoluble metallic carbonates so as to obtain a sludge and a saline aqueous liquor;

h) mixing with the aqueous sludge an additive comprising by weight about at least one half ashes from an electric thermal generating power station and the remainder alkaline hydroxide or oxide such as calcium so as to stabilize the aformentioned metallic elements;

i) withdrawing, neutralizing and discharging the saline liquor floating on top of this sludge;

j) receiving by decantation this sludge, the insoluble metallic salts and the precipitated and stabilized metallic elements; and k) filtering, and drying the insoluble metallic salts and the stabilized precipitated elements resulting from the decantation of the sludge, mixing them with the wastes and melting them in the furnace so as to vitrify them.

The treatment carried out by this process permits obtaining a vitrified product charged in particular with Zn and Pb.

Thus the process disclosed in the aforementioned patent application permits obtaining a vitrified product enriched in heavy metals, which has the advantage of limiting the amount of subsequent wastes during the complete treatment of the HGISCR, to less than 1%.

However, the uncertainty of the evolution of legislation concerning stabilization/solidification has led the Applicant to also direct its research to the obtainment of a vitrified product which has been rendered poor in toxic metals.

For this purpose, it is necessary to be able to operate in a reducing medium.

SUMMARY OF THE INVENTION

An object of the present invention is to provide a process for the treatment by reduction of solid residues containing metals, so as to extend the flexibility of the solid residue stabilization process and enable an easier adaptation to the evolutions of the legislation for the purpose of rendering the vitrified product obtained commonplace and even making it valuable, and recycling the by-products rich in metals in the metallurgical fields.

The invention therefore provides a process for the treatment of solid residues containing metals, in particular residues of the cleaning of household garbage incineration smoke, characterized in that it comprises:

a) mixing the solid residues with a solid reducing agent;

b) treating the mixture in a furnace at a temperature above 1000° C. to obtain a vitrified product rendered poor in metals and an emission of gas enriched in metallic elements;

c) effecting an air quenching of the gases rich in metals to condense in particular the metallic species;

d) filtering the products resulting from the air quenching to obtain secondary ashes rich in metallic salts; and e) following on the filtering operation, washing the smoke so as to neutralize it and discharging it to the atmosphere.

The process according to the invention further comprises:

f) forming an aqueous solution with the secondary ashes containing the metallic salts and precipitating the metals in the form of hydroxides or sulphides or insoluble metallic carbonates so as to obtain a sludge and a saline aqueous liquor;

g) withdrawing the saline liquor floating on this sludge after decantation for discharging and neutralizing it;

h) collecting this sludge containing the insoluble metallic salts and the precipitated metallic elements;

i) filtering the insoluble metallic salts and the precipitated metallic elements contained in the sludge;

j) washing the sludge with a solution at a pH identical to that of the precipitating operation f) for eliminating the residual saline species present in the hydration solution of the solids obtained after filtration; and k) drying and putting into shape the filtered and washed solid rich in valuable metals.

All these operations permit the obtainment of on one hand a vitrified product rendered poor in toxic metallic species and on the other hand a solid similar to an ore rich in metals directly valuable in the metallurgical fields.

BRIEF DESCRIPTION OF THE DRAWINGS

A better understanding of the invention will be had from the following description which is given solely by way of example with reference to the accompanying drawing in which the single figure is a flow chart illustrating how the treatment process according to the invention is carried out.

DESCRIPTION OF THE PREFERRED EMBODIMENT

The methods for the treatment of wastes and trash and in particular the methods for the treatment of household garbage are well known.

Consequently, there will be described only that which directly or indirectly concerns the invention.

Although the physico-chemical carboreduction phenomenon is well known in the steelworks field, its use in the heat treatment of wastes is unknown.

The process according to the invention is carried out in the following manner.

There is added to the mass of the HGISCR to be treated a quantity of a preferably solid reducing agent, for example carbon.

The whole is introduced in a vitrification furnace.

This furncace is advantageously of the type operating with two graphite electrodes.

The natural erosion of these electrodes promotes the reducing phenomenon.

The mixture between the solid residue, for example the HGISCR and the reducing agent, such as different varieties of carbon, for example pulverized coal, graphite, carburite, petroleum coke or other reducing mineral or organic species, is effected either directly in the melting furnace or preferably during the preparation of the charge to be vitrified.

It comprises up to 25%, advantageously between 2 and 10% and preferably 5%, of reducing agent.

The proportion of the mixture is a function of the residual content of toxic metals that may be desired to be obtained in the vitrified product and of the initial composition of the charge.

Further, this residual content also depends on the treatment time limited by the kinetics of the reactions.

The process according to the invention will be described in detail with reference to the flow chart of the drawing.

In the course of stage 1, the HGISCR are mixed with a solid reducing agent in a proportion lower than 25%.

In the course of stage 2, the mixture is treated in a furnace at a temperature above 1000° C. and preferably at 1400° C.

A vitrified product is obtained which is poor in toxic metals, it having contents of less than 0.2% Zn, 0.05% Pb, 0.01% Hg, 0.01% Cd in the course of stage 3.

The gases issuing from the furnace contain toxic metallic elements in a vapour phase.

These gases are subjected in the course of stage 4 to an air quenching followed by a filtering operation in the course of stage 5 in which secondary ashes are recovered.

After filtration, stage 6 comprises washing and neutralizing the smoke which is then discharged to the atmosphere.

The secondary ashes obtained at the end of the filtering operation are rich in toxic metallic salts (sulfphates and chlorides of Zn, Pb, Cu, Ni . . . ) The The product is then put into solution and then precipitated in an alkaline medium in stage 7.

Filtration of the precipitate in the course of stage 8 gives on one hand an aqueous solution of salts, such as NaCl, Na2SO4, KCl, K2SO4, CaCl2 and on the other hand sludges of precipitated metallic species such as $Zn(OH)_2$, $Pb(OH)_2$ . . . $PbSO_4$. These sludges are subjected to a further filtration in the course of stage 9 and to a drying and shaping operation in the course of stage 10 at the end of which valuable metallic species are obtained.

These species are in the form of an equivalent of ore rich in metals which may be commercialized for treatment in the metallurgical industry, such as for example by a pyrometallurgical process or a hydrometallurgical process.

The following experimental results have been obtained by using as a tracer element zinc which is but little volatile at high temperature (1400° C.) in the absence of a reducing agent.

A series of experiments in small crucibles heated to 1400° C. permitted determining the quantity of carbon to be added to the charge and evaluating various reducing agents.

A pilot furnace capable of treating 300 kg/h equipped with two graphite electrodes validated the results obtained in the crucibles.

The residues treated were the HGISCR coming from the St-Ouen incineration works.

The reducing agent was carburite.

The times during which the HGISCR stayed in the furnace were 15 min., 60 min., 120 min.

The test conditions are indicated in the following

| CARBON (%) | STAY (minutes) | CONTENT Zn (%) |
| --- | --- | --- |
| 5 | 15 | 0.08 |
| 5 | 60 | 0.04 |
| 5 | 120 | 0.04 |
| 2.5 | 15 | 0.21 |
| 2.5 | 30 | 0.18 |
| 2.5 | 60 | 0.16 |

This table shows that the treatment according to the invention permits obtaining a considerable reduction in the Zn content relative to the content obtained in a vitrified product treated without the addition of carbon, which is 2.3% zinc.

The process just described is carried out in a plant similiar to that described in the aforementioned patent application No. 94 13 477 filed on Nov. 9, 1994 by the Applicant, of which the conditions of use are adapted to operation in a reducing medium.

What is claimed is:

1. Process for the treatment of solid residues containing metals comprising the following steps:
    a) mixing said solid residues with a solid reducing agent;
    b) treating said mixture in a furnace at a temperature above 1000° C. to obtain a vitrified product rendered poor in metals and an emission of gas enriched in metallic elements in a vapour phase;
    c) air quenching said gases rich in metals;
    d) filtering the products resulting from said air quenching to obtain secondary ashes rich in metallic salts; and
    e) at the end of said filtering operation, washing said smoke for discharging it to the atmosphere.

2. Process according to claim 1, further comprising the following steps:
    f) forming an aqueous solution with said secondary ashes containing said metallic salts and precipitating the metals in the form selected from the group comprising hydroxides, sulphides and insoluble metallic carbonates so as to obtain a sludge and a saline aqueous liquor;
    g) withdrawing said saline liquor floating on said sludge after decantation, for discharging and neutralizing it;
    h) collecting said sludge containing said insoluble metal salts and said precipitated metallic elements;
    i) filtering said insoluble metallic salts and said precipitated metallic elements contained in said sludge;
    j) washing said sludge with a solution at a pH identical to that of said precipitating operation f) for eliminating the residual saline species present in the hydration solution of the solids obtained after filtration; and,
    k) drying and putting into shape the filtered and washed solid rich in valuable metals.

3. Process according to claim 1, wherein said mixture of said solid residues and reducing agent comprises up to 25% reducing agent.

4. Process according to claim 1, wherein said mixture of said solid residues and reducing agent comprises 2 to 10% reducing agent.

5. Process according to claim 1, wherein said mixture of said solid residues and reducing agent comprises 5% reducing agent.

6. Process according to claim 1, wherein said reducing agent is a variety of carbon.

7. Process according to claim 1, wherein said reducing agent is pulverized coal.

8. Process according to claim 1, wherein said reducing agent is graphite.

9. Process according to claim 1, wherein said reducing agent is carburite.

10. Process according to claim 1, wherein said reducing agent is petroleum coke.

11. Process according to claim 1, wherein said mixing of said solid residues with said solid reducing agent is carried out in the course of the preparation of the charge to be vitrified.

12. Process according to claim 1, wherein said mixing of said solid residues with said solid reducing agent is carried out directly in the said furnace.

13. Process according to claim 1, wherein the temperature of said furnace for the treatment of said mixture of said solid residues and said reducing agent is above 1000° C.

14. Process according to claim 1, wherein the temperature of said furnace for the treatment of said mixture of said solid residues and said reducing agent is 1400° C.

15. Process according to claim 1, wherein the vitrified product rendered poor in metals obtained at the end of said treatment of said mixture in the said furnace comprises contents of less than 0.2% Zn, 0.05% Pb, 0.01% Hg, 0.01% Cd.

* * * * *